(12) United States Patent
Cischke et al.

(10) Patent No.: US 9,327,672 B1
(45) Date of Patent: May 3, 2016

(54) ACTIVE BOLSTER WITH BLADDER MEMBER HOT WELDED TO REACTION PLATE

(71) Applicant: FORD GLOBAL TECHNOLOGIES, LLC, Dearborn, MI (US)

(72) Inventors: Kaitlin M. Cischke, Bloomfield Hills, MI (US); Stacey H. Raines, Ypsilanti, MI (US); Nicholas A. Mazzocchi, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/645,610

(22) Filed: Mar. 12, 2015

(51) Int. Cl.
*B60R 21/231* (2011.01)
*B29C 65/02* (2006.01)
*B60R 21/04* (2006.01)
*B60R 13/02* (2006.01)
*B60R 21/235* (2006.01)

(52) U.S. Cl.
CPC ............ *B60R 21/231* (2013.01); *B60R 13/02* (2013.01); *B60R 21/04* (2013.01); *B60R 21/235* (2013.01); *B29C 65/02* (2013.01); *B60R 2013/0287* (2013.01); *B60R 2021/0407* (2013.01); *B60R 2021/23504* (2013.01)

(58) Field of Classification Search
CPC .... B60R 21/231; B60R 13/02; B60R 21/235; B60R 21/04; B60R 2021/23504; B60R 2013/0287; B60R 2021/0407; B29C 65/02
See application file for complete search history.

(56) References Cited

U.S. PATENT DOCUMENTS

| | | | | |
|---|---|---|---|---|
| 3,873,395 | A * | 3/1975 | Ehrlich | B27D 3/00 100/211 |
| 8,491,008 | B2 | 7/2013 | Roychoudhury et al. | |
| 9,108,362 | B2 * | 8/2015 | Konita | B29C 65/02 |
| 9,156,423 | B1 * | 10/2015 | Aselage | B60R 21/239 |
| 9,254,807 | B1 * | 2/2016 | Aselage | B60R 21/04 |
| 2005/0253369 | A1 * | 11/2005 | Taoka | B60R 21/045 280/752 |
| 2008/0061537 | A1 * | 3/2008 | Enders | B60R 21/206 280/730.1 |
| 2009/0250915 | A1 * | 10/2009 | Best | B60R 21/02 280/742 |
| 2011/0109064 | A1 | 5/2011 | Best et al. | |
| 2011/0198827 | A1 * | 8/2011 | Roychoudhury | B60R 7/06 280/730.2 |
| 2012/0112439 | A1 | 5/2012 | Roychoudhury | |
| 2014/0326411 | A1 * | 11/2014 | Konita | B29C 65/02 156/379.6 |

FOREIGN PATENT DOCUMENTS

WO  2013132406 A1  9/2013

* cited by examiner

*Primary Examiner* — Drew Brown
(74) *Attorney, Agent, or Firm* — Vichit Chea; MacMillan, Sobanski & Todd, LLC

(57) ABSTRACT

An active bolster for an automotive vehicle includes a plastic-molded trim wall that deploys outwardly during a crash. A plastic-molded reaction plate is mounted as a deployment base. A plastic-molded bladder member is joined around a substantially sealed perimeter with the trim wall to form an inflatable bladder. The bladder member includes at least one substantially circumferential pleated baffle around a central attachment region. The central attachment region includes an attachment boss projecting toward an attachment pad on the reaction plate to form a hot weld. The attachment boss has an arched cross section defining a weld surface with an apex. The weld surface is hot welded to the attachment pad such that the apex makes first contact with the attachment pad, wherein compression of the bladder member with the reaction plate creates a contact edge moving radially outward from the apex to expel gas from the hot weld.

9 Claims, 6 Drawing Sheets

ACTIVE BOLSTER WITH BLADDER MEMBER HOT WELDED TO REACTION PLATE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster with an inflatable bladder formed by plastic wall panels that is hot welded to a plastic-walled reaction plate.

An active bolster is a vehicle occupant protection device with a gas-inflatable bladder to absorb impacts and reduce trauma to occupants during a crash. As opposed to deployable air bag cushions made of various fabrics that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes a front wall or trim panel that faces a vehicle occupant attached to a bladder member along a sealed periphery. One or both of the walls is deformable in order to provide an expandable, inflatable bladder. For example, the bladder member may have a pleated baffle (i.e., accordion-like) region that straightens out during inflation. The walls may be initially spaced apart by a small amount when in their pre-deployment, non-inflated condition. This allows ingress of the inflation gas in a manner that achieves an even inflation across the panel.

The front and back walls of a typical bladder for an active bolster are comprised of molded thermoplastics such as polyethylene, polyolefin, or PVC. They are typically injection molded but can also be blow molded. When formed separately, the front and back walls must be hermetically joined around their periphery in order to form the inflatable bladder. The joint must be strong to resist separation that could result from the high inflation pressures during inflation and that result when a passenger impacts the bolster. The peripheral seal is formed by hot welding, for example. Hot welding involves heating of the matching surfaces and then compressing them together. Examples include hot plate welding, IR welding, and laser welding.

The bladder member is typically mounted to a reaction plate that acts as a fixed deployment base, so that the trim panel moves outward toward a passenger when the bladder member expands. The reaction plate may also be comprised of a molded thermoplastic, and a joint between the reaction plate and bladder member may typically be created by hot welding. One common type of active bolster is a passenger knee bolster built into a glove box door. In this case, the reaction plate also forms an inner wall of the door (e.g., incorporating a door latch and other features).

Conforming (i.e., complementary) surfaces on the bladder member and reaction plate have been provided for being hot-welded together. The surfaces are usually flat (i.e., planar) but may also include upstanding ribs that can penetrate into the matching surface. Imperfections in the flat surfaces (e.g., pits or other deformities) may be present because of material defects or issues related to the injection molding process (e.g., die wear). The presence of deformities can a pocket for trapping gas (i.e., atmospheric air) within the hot weld. The trapped bubbles create weak points in the welded joint which can lower the strength of the weld.

SUMMARY OF THE INVENTION

The present invention uses a slightly curved welding surface so that gas that might otherwise be trapped is displaced outwardly (away from the weld interface) during compression of the parts during welding.

In one aspect of the invention, an active bolster mounts at an interior trim surface of a passenger compartment in an automotive vehicle. A plastic-molded trim wall deploys in a deployment direction toward a passenger in the passenger compartment. A plastic-molded reaction plate is mounted as a deployment base, and the plate has a planar attachment pad. A plastic-molded bladder member is joined around a substantially sealed perimeter with the front wall to form an inflatable bladder to receive an inflation gas during a crash event. The bladder member includes at least one substantially circumferential pleated baffle around a central attachment region. The central attachment region includes an attachment boss projecting toward the attachment pad and forming a hot weld. The attachment boss has an arched cross section defining a weld surface with an apex. The weld surface is hot welded to the attachment pad such that the apex makes first contact with the attachment pad, wherein compression of the bladder member with the reaction plate creates a contact edge moving radially outward from the apex to expel gas from the hot weld.

DETAILED DESCRIPTION OF PREFERRED EMBODIMENTS

Figure 1:
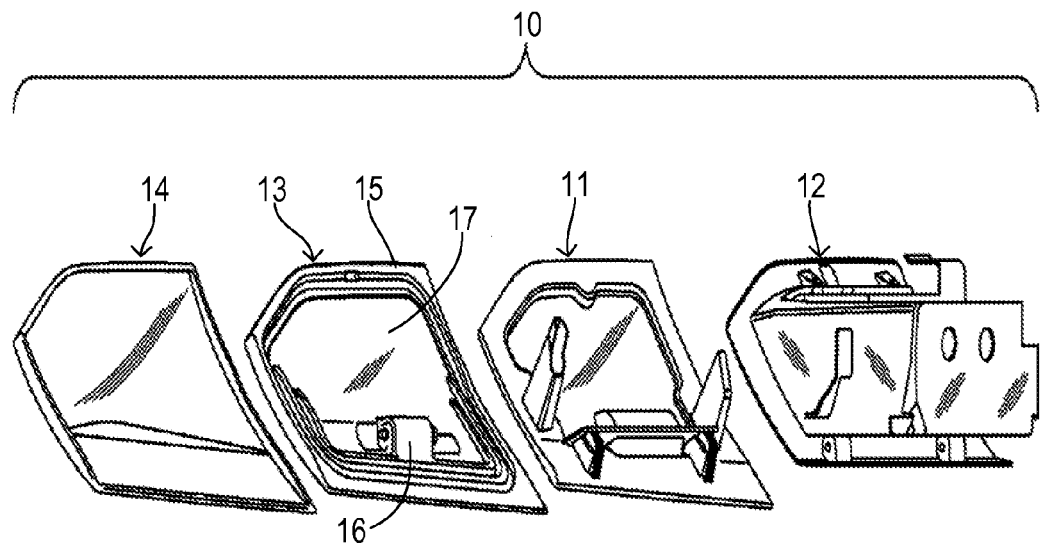
FIG. 1 is an outward-looking, exploded perspective view of an active knee bolster glove box door system of a type to which the present invention can be applied.

Referring now to FIG. 1, a prior art active knee bolster system 10 has a base panel component 11 which forms the foundation for the bolster. Base 11 may be either attached to the vehicle by hinging from a storage cavity or glove box 12 as shown in FIG. 1, or mounted to another structure such as an instrument panel support located below a steering column, for example. Such locations are accessible to the knees of an individual riding in a corresponding seating position within a vehicle.

In this embodiment, base 11 is a door inner wall or liner that acts as a reaction surface for supporting an inflatable bladder formed by a back (bladder) wall 13 and a front (trim) wall 14 that are joined around their periphery 15. Walls 13 and 14 are preferably comprised of molded plastics (such as thermoplastic polyolefin (TPO)) and are joined by plastic hot welding, such as hot plate or vibration welding, to form a peripheral seal around a central region 17 for forming an inflatable bladder. An inflation gas source 16 is electronically controlled for activating during a crash to release gas to inflate the bolster. Front wall 14 may comprise the Class A interior trim surface such as the outside of the glove box door, or an additional skin or cover (not shown) can be applied to its outer surface.

Figure 2:
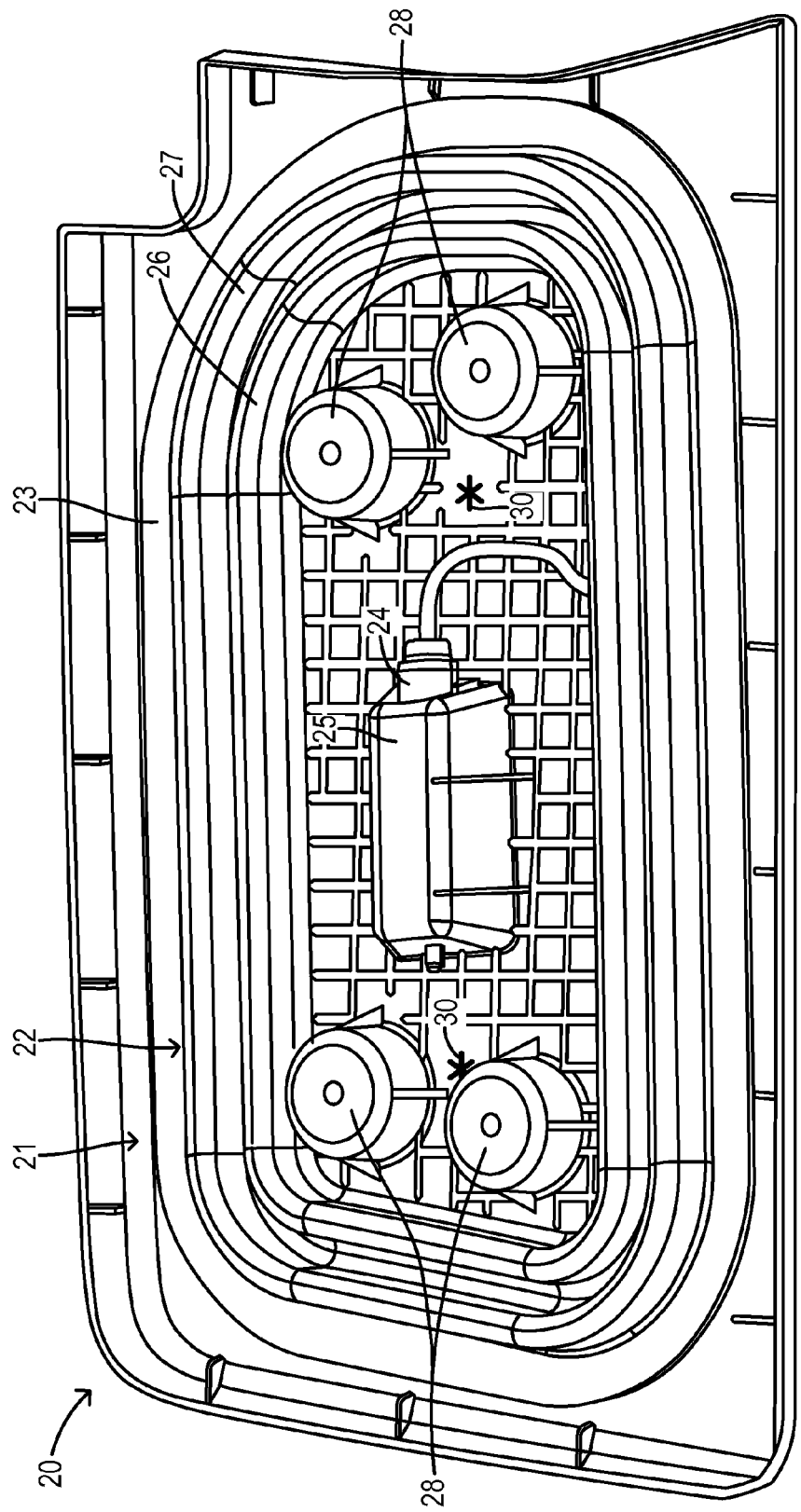
FIG. 2 is a rear perspective view of an inflatable bladder assembly of an active bolster.

FIG. 2 is a rear view of one type of known inflatable bladder 20 for an active bolster. A plastic-molded front trim wall 21 overlies a plastic-molded, expandable bladder member 22. Wall 21 and bladder member 22 are joined around a closed perimeter region 23 to form an inflatable bladder having an open central chamber between wall 21 and bladder member 22 to receive an inflation gas from an inflator 24 mounted in a recess 25 of back wall 22 during a crash event. Bladder member 22 includes a plurality of pleats, such as 26 and 27, to accommodate the expansion of bladder member 22 during inflation. A plurality of attachment towers (i.e., bosses) 28 project from a central region of bladder member 22 disposed within baffle pleats 26 and 27. Bosses 28 are used to mount bladder member 22 to a reaction surface (not shown). Vent holes 30 are comprised of an asterisk-shaped pattern cut through bladder wall 22 in order to vent the bladder chamber.

Figure 3:
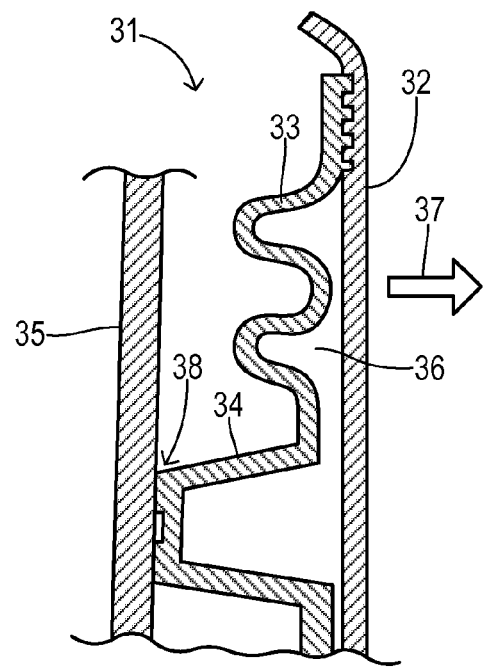
FIG. 3 is a side cross section showing a prior art active bolster assembly.

FIG. 3 shows a cross-section of a bolster 31 including a front trim wall 32 peripherally sealed to a bladder member 33. Bladder member 33 includes an attachment boss 34 welded to a reaction wall 35, which may be comprised of a glove box door inner liner, for example. During deployment as a result of an inflation gas being supplied into a bladder cavity 36, front trim wall 32 deploys in a deployment direction 37 toward a passenger in the passenger compartment of a vehicle. A hot weld 38 retains bladder member 33 on reaction wall 35 prior to, during, and after deployment of the bolster. Retention of bladder member 33 is critically important during all three phases.

Figure 4:
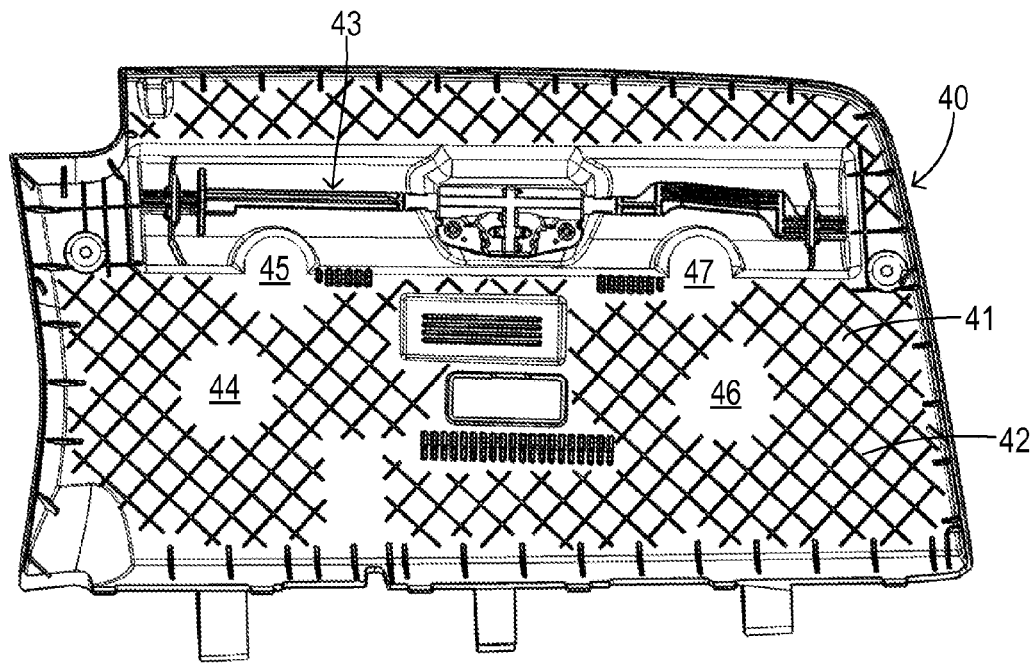
FIG. 4 is a rear perspective view of an inner glove box door with attachment pads for receiving a bladder member.
Figure 5:
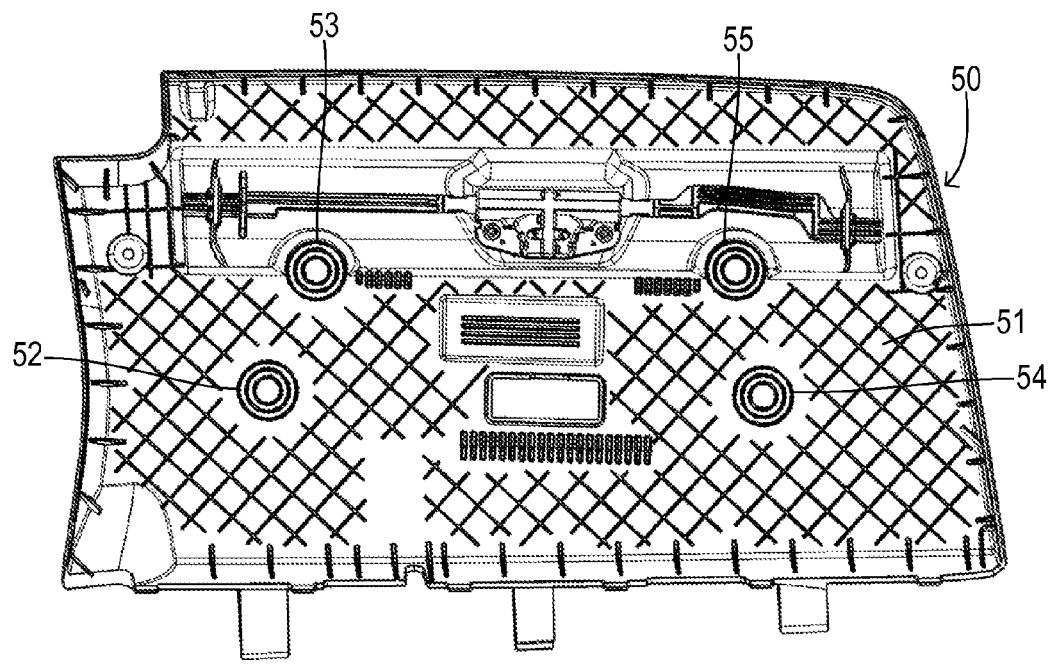
FIG. 5 is a rear perspective view of an inner glove box door with ribbed attachment pads for receiving a bladder member.

FIG. 4 shows a plan view of an inside wall 40 for a glove box door which functions as a reaction plate for active bolster deployment. An inside surface 41 faces the bladder member and may be formed as an injection molded plastic component. A plurality of raised ribs 42 may be provided on surface 41 for strengthening wall 40. As part of the functioning as a glove box door, a latch 43 is mounted in a corresponding receptacle in wall 40. A plurality of attachment pads 44-47 are arranged to receive respective attachment bosses on the bladder member. Each attachment pad 44-47 has a flat, planar shape adapted to be not welded to the respective attachment boss. FIG. 5 shows an alternative embodiment wherein the flat, planar attachment pads include welding ribs. In particular, reaction plate 50 has an inside surface 51 wherein a plurality of attachment pads 52-55 each includes a plurality of concentric upstanding ribs projecting from the flat, planar surface of the attachment pads. The ribs increase penetration of the hot weld into the surface of the corresponding attachment boss.

Figure 6:
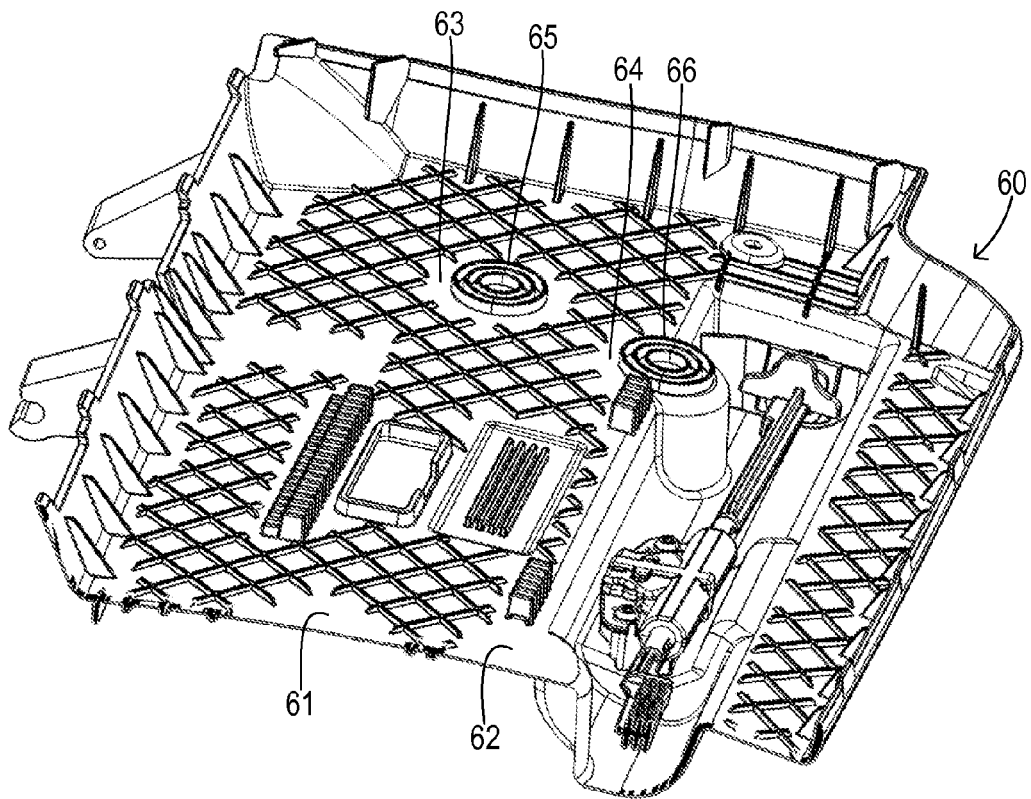
FIG. 6 is cross-sectional, perspective view of an inner glove box door.

FIG. 6 is a perspective view of another door inner wall/reaction plate 60 having attachment pads with and without ribs. Plate 60 is cross-sectioned through flat attachment pads 61 and 62 without ribs. Attachment pads 63 and 64 are also shown, wherein a series of ribs 65 and 66 are utilized. The present invention is applicable to attachment pads with or without ribs.

Figure 7:
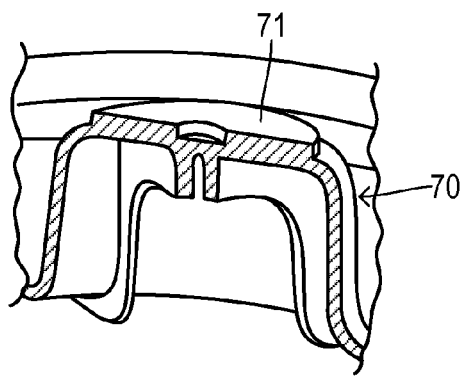
FIG. 7 is a cross-sectional view of an attachment boss of a prior art bladder member.

FIG. 7 shows a cross-section through an attachment boss or tower 70 of the prior art wherein a substantially flat, planar surface 71 conforms with the flat, planar surface of a corresponding attachment pad on the reaction plate to which it is to be hot welded.

Figure 8:
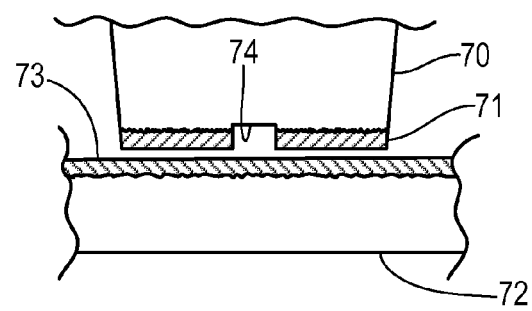
FIG. 8 shows complementary, planar welding surfaces of a prior art attachment tower and reaction plate during hot welding.

FIG. 8 depicts attachment boss 70 being hot welded with a reaction plate 72 wherein planar surface 71 of attachment boss 70 has become molten as a result of the application of heat. Likewise, planar surface 73 of reaction plate 72 is molten and the components are about to be compressed in order to obtain intermixing of the molten layers, thereby bonding the components by a hot weld. A recess 74 may be provided in the end wall of attachment boss 70 to receive excess molten material and to form an additional mechanical interlock. Due to the complementary planar character of surfaces 71 and 73 which causes all portions of the surfaces to come together at the same time during compression, air bubbles may become entrapped at the hot welding interface as described above.

Figure 9:
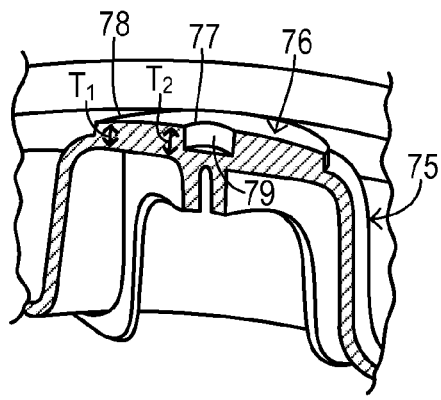
FIG. 9 is a cross-sectional view of an attachment boss of the present invention with a curved welding surface for joining with a planar reaction plate.

In order to alleviate the possibility of bubble formation, the present invention employs a welding surface on an attachment boss 75 that has an arched cross section as shown in FIG. 9. Thus, boss 75 has a cross section with substantially straight sides extending toward the reaction plate and having a weld surface 76 with a curved profile including an apex 77 at a center portion of surface 76. In a preferred embodiment, weld surface 76 is rounded or curved between apex 77 and an outer edge 78. In order to provide the arched cross section, the thickness of the end wall forming attachment boss 75 may increase from a thickness $T_1$ at edge 78 to a greater thickness $T_2$ at apex 77. Attachment boss 75 may optionally include a center depression 79. In FIG. 9, attachment boss 75 is a generally cylindrical tower wherein each longitudinal cross section exhibits the same arched cross sectional profile. As an alternative to the rounded shape from apex 77 to edge 78, a straight slope could be used. Furthermore, apex 77 can be slightly off center or can comprise a ridge when the attachment boss has an extended shape instead of a tower, as described in a later embodiment.

Figure 10:
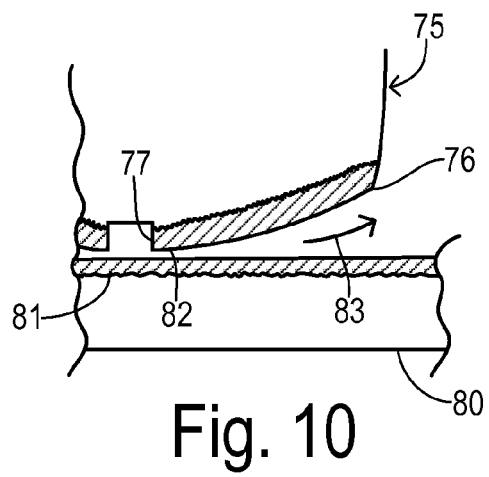
FIG. 10 shows formation of a hot weld between the curved welding surface and planar surface, resulting in gas being expelled from the weld.

FIG. 10 shows formation of a hot weld between welding attachment boss 75 and a reaction plate 80 wherein facing surfaces 76 and 81 are in a molten state from heating. Due to the arched cross section of boss 76 defining a curved weld surface 76, apex 77 makes first contact with an attachment pad surface 81, and the subsequent compression creates a contact edge 82 that moves radially outward away from apex 77 during formation of the hat weld to expel gas from between the approaching surfaces as indicated by an arrow 83. In the event that the attachment pad includes upstanding ribs, the contact edge moving radially outward may include the distal end of each rib where the hot weld is being formed.

Figure 11:
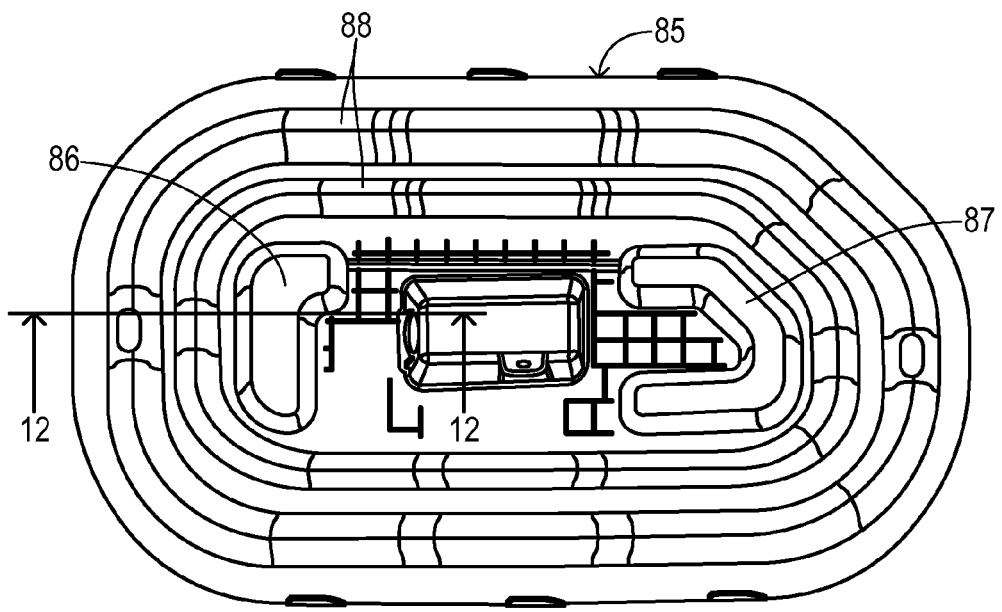
FIG. 11 is rear plan view of a bladder member according to another embodiment of the prior art.
Figure 12:
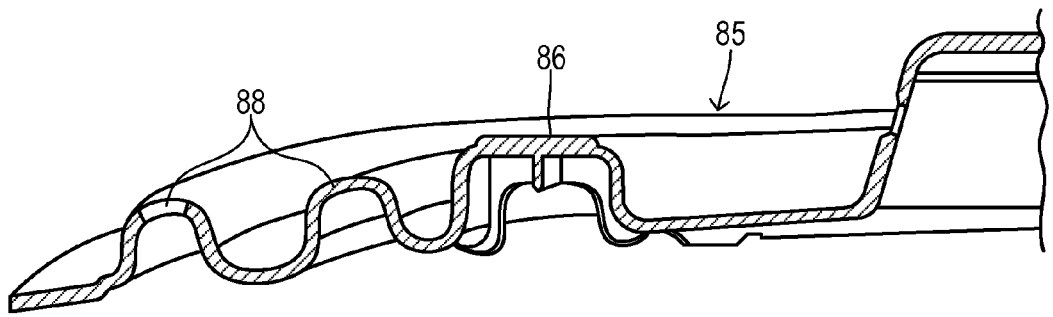
FIG. 12 is a cross-sectional view through one of the attachment bosses of FIG. 11.

Rather than cylindrically shaped attachment towers, the bosses may include elongated channel shapes, as shown in FIGS. 11 and 12. A bladder member 85 includes attachment bosses 86 and 87 in a central attachment region defined within a plurality of pleated baffles 88. As shown in FIG. 12, attachment boss 86 extends by a first height away from the trim wall side of bladder member 85, while pleated baffles 88 extend by a second height which is less than the first height. The increased height of attachment boss 86 enables attachment to the reaction plate without interference from baffles 88.

Figure 13:
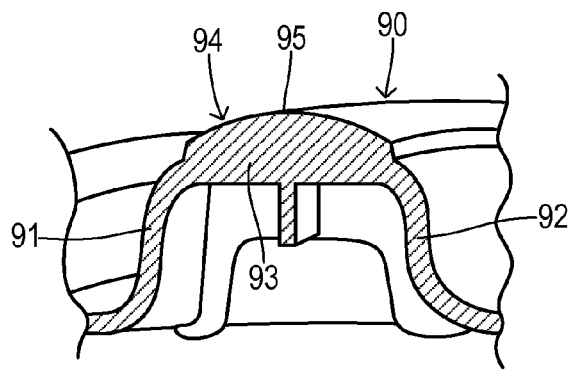
FIG. 13 is a cross section of an improved attachment boss as a modification of the bladder member of FIG. 11.

FIG. 13 shows a modification to the cross-sectional shape of attachment boss 86 to avoid the trapped bubble formations that can occur using the complementary, flat surfaces shown in FIGS. 11 and 12. Thus, an attachment boss 90 has a cross-sectional profile with an arched shape. The arched shape includes cross-sectional sides 91 and 92 joined by an upper wall 93 defining a weld surface 94 that projects toward a planar attachment pad of a reaction plate (not shown). Weld surface 94 has an apex 95 which extends as a center ridge along elongated attachment boss 90. With apex 95 defining a ridge, compression of the bladder member against the reaction plate creates a contact edge that likewise moves radially outward from apex ridge 95 to expel gas from the hot weld.

Figure 14:
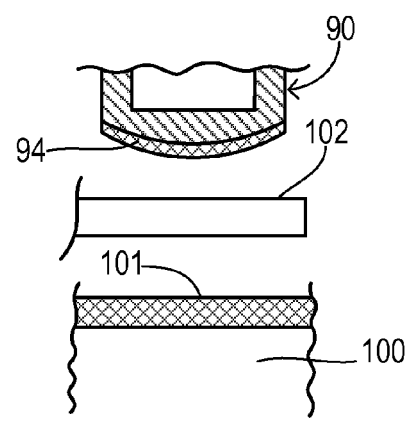
FIGS. 14-16 represent successive assembly steps during hot welding of the attachment boss of FIG. 13.
Figure 15:
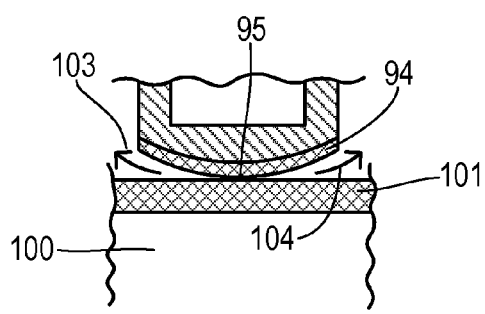
Figure 16:
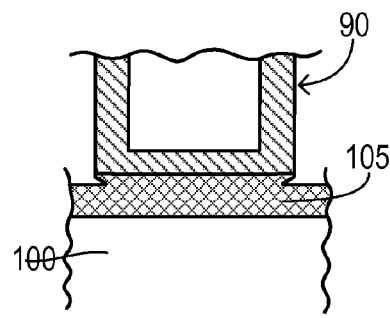

Formation of a hot weld using the elongated-channel attachment boss is shown in greater detail in FIGS. 14-16. A reaction plate 100 is registered into position adjacent the bladder member so that attachment boss 90 is aligned with an attachment pad 101. A heating source such as a hot plate 102 is arranged between weld surface 94 and attachment pad 101 to melt the corresponding surfaces. After melting, hot plate 102 is withdrawn and the components are moved together as shown in FIG. 15. Apex ridge 95 makes first contact as shown in FIG. 15 so that as molten layers 94 and 101 are brought together, gas that could otherwise become entrapped is expelled from the hot weld as indicated by arrows 103 and 104. As shown in FIG. 16, a hot weld 105 is formed after compression and subsequent cooling of the formerly molten layers to retain the bladder member on the reaction plate without weak regions caused by entrapped gas bubbles.

What is claimed is:

1. An active bolster for mounting at an interior trim surface of a passenger compartment in an automotive vehicle, comprising:
    a plastic-molded trim wall for deploying in a deployment direction toward a passenger in the passenger compartment;
    a plastic-molded reaction plate mounted as a deployment base and having a planar attachment pad; and
    a plastic-molded bladder member joined around a substantially sealed perimeter with the trim wall to form an inflatable bladder to receive an inflation gas during a crash event, wherein the bladder member includes at least one substantially circumferential pleated baffle around a central attachment region, wherein the central attachment region includes an attachment boss projecting toward the attachment pad and forming a hot weld, wherein the attachment boss has an arched cross section defining a weld surface with an apex;
    wherein the weld surface is hot welded to the attachment pad such that the apex makes first contact with the attachment pad, and wherein compression of the bladder member with the reaction plate creates a contact edge moving radially outward from the apex to expel gas from the hot weld.

2. The active bolster of claim 1 wherein the weld surface around the apex is rounded.

3. The active bolster of claim 1 wherein the attachment boss is comprised of a generally cylindrical tower.

4. The active bolster of claim 1 wherein the attachment boss is comprised of an elongated channel shape.

5. The active bolster of claim 1 wherein the attachment boss extends from the trim wall by a first height, and wherein the pleated baffle extends from the trim wall by a second height less than the first height.

6. The active bolster of claim 1 wherein the bladder member includes a plurality of attachment bosses and wherein the reaction plate includes a corresponding plurality of attachment pads.

7. The active bolster of claim 1 wherein the reaction plate includes a penetrating rib extending from the attachment pad.

8. The active bolster of claim 1 comprising a glove box door, wherein the reaction plate forms an inside wall of the glove box door.

9. An active bolster comprising:
    a reaction plate with planar welding pads; and
    a bladder member having attachment bosses hot welded to the pads;
    each boss having an arched cross section with an apex hot welded to a respective pad such that the apex makes first contact and wherein compression of the bladder member with the reaction plate creates a contact edge moving radially outward from the apex to expel gas from the hot weld.

* * * * *